DISPLAY DEVICE HAVING A PHOTO-SENSITIVE LAYER
AND AN ELECTRO-LUMINESCENT LAYER
ASSOCIATED WITH ONE ANOTHER
Filed Sept. 4, 1957

INVENTOR
GESINUS DIEMER
HENDRIK JACOBUS MARIA JOORMANN
JOHANNES GERRIT VAN SANTEN
PIETER ABRAHAM BOTER
BY
[signature]
AGENT United States Patent Office 3,117,232
Patented Jan. 7, 1964

3,117,232

DISPLAY DEVICE HAVING A PHOTO-SENSITIVE LAYER AND AN ELECTRO-LUMINESCENT LAYER ASSOCIATED WITH ONE ANOTHER

Gesinus Diemer, Hendrik Jacobus Maria Joormann, Johannes Gerrit Van Santen, and Pieter Abraham Boter, all of Eindhoven, Netherlands, assignors to North American Philips Company Inc., New York, N.Y., a corporation of Delaware Filed Sept. 4, 1957, Ser. No. 682,011
Claims priority, application Netherlands Sept. 5, 1956
10 Claims. (Cl. 250—213)

This invention relates to image screens having a luminescent layer provided with an electrode and a photo-sensitive layer, likewise provided with an electrode, which is associated therewith in elements, these elements controlling the luminance of the associated elements of the first-mentioned layer.

In image screens of this kind, which are often referred to as solid-state image intensifiers, the local variations in impedance of the photo-sensitive layer brought about by a primary radiation image thrown onto this layer result in a local change in that portion of an electric voltage applied to the electrodes which appears across the luminescent layer. These local changes in voltage bring about a local change in the luminance of this luminescent layer, resulting in a luminescent image, either positive or negative, and corresponding to the primary radiation image projected on the photo-sensitive layer.

In one of the first solid-state image intensifiers of this kind described in the literature, a photo-sensitive layer of uniform thickness was provided, either directly or with the interposition of a thin opaque intermediate layer, on a luminescent layer consisting substantially of electroluminescent material. Since in such an image intensifier the photo-conduction is in the direction of the thickness of the photo-sensitive layer, the results did not come up to expectations. Since then several constructions have come to be known in which the photo-conduction is substantially in the direction of the surface of the photo-sensitive layer. A more advantageous ratio between the dark impedance of the photo-sensitive elements and the impedance of the associated luminescent elements is thus obtained. Thus, for example, it has been described that the photo-sensitive material may be provided in the form of small columns which are transverse of the luminescent layer and relatively separated by a transpart insulator scattering the primary radiation incident thereon.

In another known construction, a large number of V-shaped grooves cut into a transparent insulating plate of synthetic resin are filled up with the photo-sensitive material and subsequently covered with an intermediate layer of conductive cadmium sulphide, which layer is opaque and diffuses the electric current, and an electro-luminescent layer. The electrode for the photo-sensitive material in this case is constituted by a plurality of narrow conductive tracks which are electrically inter-connected and each arranged on the bottom of a groove in the insulating plate. An improvement with respect to this construction has been obtained by cutting mutually parallel V-shaped grooves in a comparatively thick photo-sensitive layer which, with the interposition of an opague layer and a weakly conductive layer diffusing the electric current, is applied to an electro-luminescent layer and which on the side remote from the electro-luminescent layer is provided with a plane electrode. The grooves are cut to such a depth that they reach into the intermediate layer adapted to diffuse the electric current. The line-shaped electrode parts remaining on the tops between the grooves are interconnected, thus constituting the electrode for the photo-sensitive material. The electrode for the electro-luminescent layer is constituted in the usual manner by a conductive surface layer of a transparent insulating plate carrying the electro-luminescent layer.

The last-mentioned embodiment is not satisfactory either, since it has been found that the cutting of the grooves in the photo-sensitive layer, which consists of photo-sensitive material in a binder to be hardened, involves a change in the sensitivity and the response time of the photo-sensitive material, while an after-effect of the hardening of the binder upon these properties has also been ascertained.

The object of the invention is to provide an image screen of the kind mentioned in the preamble in which the above-mentioned disadvantages are avoided.

The image screen according to the invention is characterized in that the photo-sensitive layer extends over an underground reliefed substratum of insulating material which is provided between the photo-sensitive layer and the luminescent layer and which has been fluted so as to form hills and dales, the dales extending to adjacent the luminescent layer and the electrode of the photo-sensitive layer being provided on the tops of the hills.

Since the photo-sensitive layer, after being formed, is not processed mechanically, the properties of the photo-sensitive material are not detrimentally affected, while because of the thinness of this layer there is little if any after-effect of the binder upon the photo-sensitive material. The photo-sensitive layer may be applied by vaporisation, a binder then not being required, but the layer may alternatively be applied to the reliefed substratum by spraying or in an other manner.

In one advantageous embodiment of the image screen according to the invention, the substratum is constituted by an insulating layer extending parallel to the luminescent layer and provided with a plurality of parallel, more or less V-shaped grooves.

In another embodiment of the image screen according to the invention, the substratum is constituted by the insulating envelope of a plurality of thin metal wires extending parallel to one another and to the luminescent layer, the wires having a diameter considerably less than that of the insulating envelope. It is advantageous for the wires to consist of aluminum oxide provided by cataphoresis.

In again another embodiment of the picture screen according to the invention, the substratum is constituted by a plurality of beads of insulating material, for example glass, mounted in a more or less serrated manner in a plane parallel to the luminescent layer and embedded with their halves adjacent this layer in a feebly conductive layer diffusing the electric current.

As previously mentioned, it is known to utilise a layer diffusing the electric current between a photo-sensitive layer comprising a plurality of triangular ledges and the luminescent layer of a solid-state image intensifier. The luminescence of the luminescent layer is thus prevented from concentrating in lines at the foot of the photo-sensitive ledges. Such a diffusing layer, the electrical resistance of which is dependent on voltage and which is feebly conductive at a low voltage, for example due to this layer consisting substantially of conductve cadmium sulphide, may advantageously also be used in the image screen according to the invention.

According to a further elaboration of the invention however, unwanted concentration of the luminescence may advantageously be counteracted by providing separate auxiliary electrode elements of high electric conductivity between the layer of luminescent material and the substratum, at the dales thereof.

In the image screen according to the invention, the luminescent layer may consist of an electroluminescent material and a binder. However, it is possible for the layer to consist substantially of a phosphor exhibiting field extinction or quenching of the luminescence. In operating such an image screen according to the invention, the luminescent layer is irradiated more or less evenly with an auxiliary radiation bringing this layer to luminescence. Local increases in voltage across this layer due to changes in impedance of the photo-sensitive layer result in a more or less decreased luminescence, so that the luminescent layer shows an image that is the negative of the primary radiation image thrown onto the photo-sensitive layer.

In order that the invention may be readily carried into effect, several embodiments will now be described more fully, by way of example, with reference to the accompanying drawing, in which FIG. 1 shows an isometric projection of part of a first embodiment of the image screen according to the invention in which several layers are removed in part;

It is to be noted that, for the sake of clarity, several dimensions in the figures shown on an enlarged scale are not represented in the correct mutual proportion, more particularly the dimensions of certain layers in the direction of thickness thereof being shown in a more or less exaggerated manner. The essential dimensions are for the greater part mentioned in the description following hereinafter.

Figure 1:
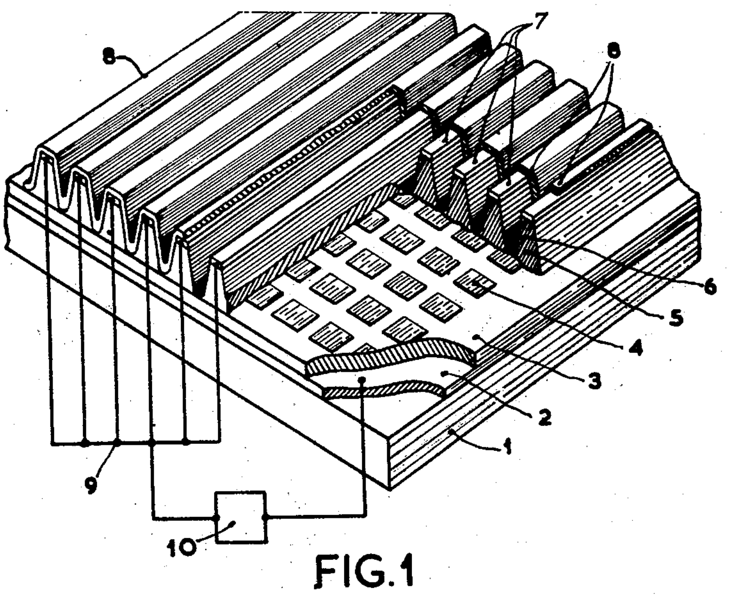

In the image screen shown in FIG. 1, a plane transparent electrode 2, which consists of a thin layer of conductive tin-oxide, is provided on a transparent glass carrier plate 1. The electrode 2 is covered with an electroluminescent layer 3, which consists substantially of an electroluminescent material, for example zinc sulphide activated with copper and aluminum, and a binder such as urea formaldehyde. The layer 3 has a thickness of about 50 microns.

A plurality of parallel insulating ledges 5 are provided on the side of the layer 3 remote from the carrier plate 1. Between every two sequential ledges 5 a V-shaped groove 6 is formed, the walls of which make an angle of about 60° and which reach to the layer 3. The ledges 5 are of insulating material, for example polystyrene or fine-grained powdered glass in a binder such as urea formaldehyde, which, if necessary, is made impervious to the radiation emanating from the layer 3 by the addition of colouring matter or a black lacquer. The ledges have a height of approximately 0.5 mm. and a distance between their centres of about 0.8 mm. The plane tops of the ledges have a width of about 200 microns and are provided with conductive electrode tracks 7 of uniform width, which may be, for example, of silver.

Between the electro-luminescent layer 3 and the ledges 5 there are provided a plurality of separate, electrically conductive auxiliary-electrode elements 4, which may consist of metal, for example aluminum applied by evaporation or desposited in another manner. These elements may have a thickness of several microns. They are ranged in a manner such that each groove 6 terminates in a series of auxiliary-electrode elements extending on each side of this groove under a portion of the adjacent ledges 5. The dimension of the auxiliary electrode elements in the direction of length of the grooves substantially equals that in the direction transverse thereof. Since the auxiliary electrode elements 4 must be galvanically spaced apart, the last-mentioned dimension is less than the distance between the centres of two sequential grooves. The spacings between the auxiliary electrode elements have a width of approximately 200 microns.

The ledge 5 with the electrode tracks 7 provided thereon are obtained by scraping simultaneously, by means of a scraping instrument, a plurality of parallel grooves extending to the auxiliary electrode elements 4 in a closed insulating layer, preferably consisting of fine-grained powdered glass and a binder which layer is provided with a metallisation and applied to the electroluminescent layer 3 with its auxiliary electrode elements 4. However, the grooves may alternatively be provided in a manner other than simultaneously with the use of a scraping instrument.

If, in cutting the grooves 6, the auxiliary electrode elements 4 would be cut through, this need not be regarded as serious provided the electroluminescent layer 3 is not cut deeply. It may be advantageous for the electroluminescent layer 3 and the auxiliary electrode elements 4 to be separated by a thin insulating layer (not shown in FIG. 1) consisting substantially of titanium dioxide or magnesium oxide. This layer reflects the light omitted by the layer 3 during the operation of the image screen and can prevent the layer 3 from being cut if, in forming the ledges 5, the auxiliary electrode elements would be cut through.

The ledges 5 with the electrode tracks 7 on top thereof constitute the substratum for a continuous layer 8, which consists substantially of a photo-sensitive material, that is to say a material, the specific electrical impedance of which may be varied in a reversible manner by electromagnetic and/or corpuscular radiation. The layer 8, which may consist, for example, of cadmium sulphide activated with copper and chlorine, has a mean thickness of from 15 to 30 microns and may be provided on the substratum for example, by evaporation or spraying.

As will be noted, as the ledges 5 are applied on top of the electro-luminescent layer 3 after the latter has been applied onto the glass support 1, the glass support 1 and layer 3 support the ledges 5 and subsequently-applied photoconductive layer 8.

For putting the described image screen into operation the electrically interconnected electrode tracks 7, which interconnection is shown diagrammatically by 9 in FIG. 1, are connected to one terminal of a voltage source 10, the other terminal of which is connected to the transparent plane electrode 2 on carrier plate 1. When the layer 8 containing the photo-sensitive material is irradiated, the impedance locally formed by this layer between an electrode track 7 and an auxiliary electrode element 4, at the bottom of a groove 6, is varied to a greater or lesser extent, resulting also in local variation of the voltage across that part of the electroluminescent layer 3 which is located between the relevant auxiliary electrode element 4 and the opposing part of the plane electrode 2. The voltage across the electroluminescent layer 3 thus varies as a function of the irradiation intensity of the layer 8, so that the layer 3 becomes luminescent in the pattern of a radiation image thrown onto the layer 8.

The voltage source 10 is preferably designed to supply alternating voltage or periodical voltage pulses, the frequency usually being chosen not lower than 50 c./sec. It may be advantageous if the voltage to be applied to the electrodes of the image screen has more than one frequency.

In the image screen shown in FIG. 1, the electrode tracks 7 associated with the photo-sensitive layer 8 are located under this layer. The electrode tracks can thus be formed simultaneously with the grooves 6, as described hereinbefore. However, there are no fundamental objections against providing the electrode tracks after the layer 8 has been applied and hence on the outer side of the layer 8. The electrode tracks may, in this case, be pressed upon the layer 8 at the tops of the ledges 5, for example, with the use of a conductive ink. An image screen of such a structure may be advantageous if the primary radiation received by the layer 8 is strongly absorbed by it and hence has a low depth of penetration.

In order to suppress any feedback of the luminescent light emitted by the layer 3 to the photo-sensitive layer 8, the material of the ledges 5 may be chosen to be impervious to this radiation, as mentioned in the foregoing. The auxiliary electrode elements 4 may naturally shield the parts of the layer 8 in the depth of the grooves with respect to the electroluminescent light. The spacings between the auxiliary electrode elements may in this case be covered with a black lacquer.

Such steps may be omitted, if, as previously mentioned, a thin insulating and reflecting layer is applied between the electroluminescent layer 3 and the auxiliary electrode elements 4.

Figure 2:
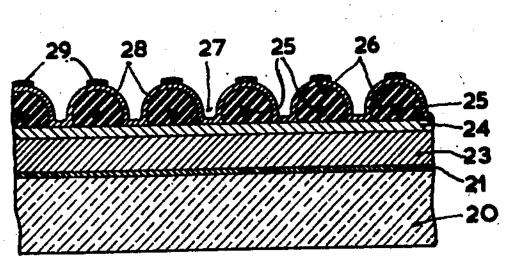
FIG. 2 shows part of the cross-section of a second embodiment.

FIG. 2 shows a second embodiment of the image screen according to the invention, in which, similarly as in the embodiment of FIG. 1, a transparent carrier plate 20 is provided, part of a cross-section with a plane transverse of this carrier plate being shown. The carrier plate 20 is provided, on one side, with a transparent electrode 21, to which an electroluminescent layer 23 is applied. A layer 24 which consists of conductive cadmium sulphide and a binder and which diffuses the electric current, extends over the electroluminescent layer 23.

On the side of the layer 24 remote from the carrier plate 20, there is arranged a grid comprising a plurality of equidistant parallel thin metal wires 25. The wires of this grid, which may consist, for example, of molybdenum wire having a diameter of 30 microns, are each surrounded by an insulating envelope 26. These envelopes, which may be of aluminum oxide ($Al_2O_3$), are provided on the wires by means of cataphoresis. The envelopes 26 which except on the side of the layer 24 have a thickness of about 300 microns, constitute parallel ledges with spacings 27 each having a width of about 150 microns. These ledges, together with the intermediate narrow strips of the conductive layer 24, constitute the substratum for a photo-sensitive layer 28 having a thickness of from 10 to 25 microns, which consists of photo-sensitive cadmium sulphide applied by evaporation. At the tops of the ledges formed by the envelopes 26, the layer 28 is provided with linear electrodes 29 which are electrically interconnected. These linear electrodes are pressed upon the layer 28 after the provision thereof.

A reflecting layer substantially consisting of titanium dioxide or magnesium oxide may be used instead of the layer 24 diffusing the electric current, which reflecting layer is covered with a large number of individual conductive auxiliary-electrode elements on the side of the wire grid 25 and the ledges 26. The auxiliary electrode elements extend under adjacent ledges 26 and their spacings 27 in a similar manner as the auxiliary electrode elements 4 in the embodiment of FIGURE 1 extend under the ledges 5 and the grooves 6.

Figure 3:
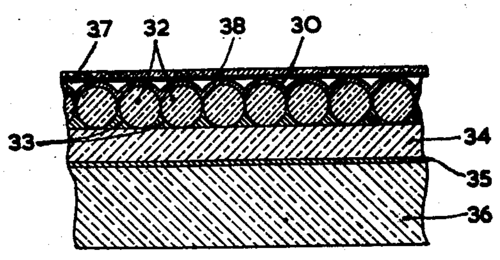
FIG. 3 shows part of the cross-section of again another embodiment.

In the embodiment of which a part of the cross-section is shown in FIGURE 3, the substratum for a photo-sensitive layer 30 is constituted by a large number of small insulating balls 32, the lower halves of which are embedded in a layer 33 diffusing the electric current. This feebly conductive and voltage sensitive layer is provided on an electroluminescent layer 34 which is applied to a conductive surface layer 35 of a glass plate 36, said layer 35 constituting an electrode. The balls 32 are glass beads of from 400 to 500 microns in diameter. These beads are embedded in a more or less serrated manner in the layer 33.

The electrode associated with the photo-sensitive layer 30 is constituted by a metallisation 37 of a foil of synthetic material 38, which is pressed with this metallisation on the tops of the photo-sensitive layer 30. The metallisation 37 may be a closed or grid-like metal layer on the foil 38. The foil 38 and the metallisation 37 must be pervious to the primary radiation to be received by the photosensitive layer 30.

In the embodiments shown in FIGS. 1 and 2 the electrode associated with the photo-sensitive layer comprises a plurality of electrode tracks supported by the substratum or the photo-sensitive layer itself. However, it is possible, similarly as in the embodiment of FIG. 3, to form the electrode by metallisation of a transparent flexible foil which is pressed with the metallisation onto the tops of the photo-sensitive layer. In the embodiments shown in FIGS. 1 and 2 in which the tops constitute parallel tracks, such a metallisation may comprise parallel tracks corresponding to the tops of the ledges. In such a case these tracks need not be pervious to the primary radiation.

In an image screen according to the invention, an insulating and transparent material may be provided on the photo-sensitive layer, filling up the dales thereof, for the purpose of protecting this layer. It is alternatively possible to utilise therefore a material which luminesces by the action of the primary radiation, the photo-sensitive layer in this case having to respond to this luminescent radiation.

In the embodiments above described, reference has always been made to electro-luminescent material as the main constituent of the luminescent layer. Instead of using an electroluminescent material, it is alternatively possible to utilise a luminescent material exhibiting field extinction of the luminescence produce dby an auxiliary radiation. Such a material is for example, zinc sulphide activated with silver and gallium. In operating an image screen with such a luminescent material exhibiting field extinction, it is necessary to bring the relevant layer to luminescence by means of a suitable auxiliary radiation, which luminescence is locally extinguished to a greater or lesser extent by changes in impedance of the photosensitive layer.

What is claimed is:

1. A display device comprising a transparent support, a first transparent electrode on said support, a layer of electroluminescent material on said first electrode, a plurality of substantially parallel, upstanding, insulating members mounted over and supported by said electroluminescent layer and defining therebetween a plurality of outwardly-opening generally V-shaped grooves separating the insulating members, a single continuous substantially uniformly-thick deposited layer of photosensitive material extending over and supported on said insulating members and extending inside the grooves adjacent the electro-luminescent layer to form an undulating body, and second electrode means associated with the peaks of the undulating body of photosensitive material remote from the electro-luminescent layer.

2. A device as set forth in claim 1 wherein the insulating members comprise insulator-clad, thin, metal wires extending parallel to each other and to the electro-luminescent layer.

3. A device as set forth in claim 2 wherein the insulation of the clad wires comprises cataphoretically-applied aluminum oxide.

4. A display device comprising a transparent support, a first transparent electrode on said support, a layer of electroluminescent material on said first electrode, a current-diffusing medium on the electro-luminescent layer, a plurality of substantially parallel, upstanding, insulating members mounted on and supported by said current-diffusing medium and defining therebetween a plurality of grooves separating the insulating members, a single, continuous, uniformly-thick, evaporated layer of photoconductive material extending over and supported on said insulating members and extending inside the grooves to form an undulating body, and a second electrode contacting the peaks only of the undulating body of photoconductive material.

5. A device as set forth in claim 4 wherein the insulating members are opaque.

6. A device as set forth in claim 4 wherein a thin insulating reflecting layer is disposed between the electroluminescent layer and the current-diffusing medium.

7. A device as set forth in claim 4 wherein the current-diffusing medium comprises plural, discrete, conductive elements each arranged to underlie adjacent insulating members.

8. A device as set forth in claim 4 wherein the current-diffusing medium comprises a layer of slightly-conducting material, and the insulating members comprise plural beads lying in a common plane and embedded in the current-diffusing medium.

9. A display device comprising a planar transparent support, a first transparent electrode on said support, a layer of electro-luminescent material on said first electrode, current-diffusing elements on said electro-luminescent layer, a plurality of substantially parallel, upstanding, insulating members mounted on and supported by said electro-luminescent layer and defining therebetween a plurality of grooves separating the insulating members, a single, continuous, uniformly-thick layer of photo-conductive material extending over and supported on said insulating members and extending inside the grooves to form an undulating body, and a second electrode of grid-like form contacting the peaks only of the undulating body of photo-conductive material.

10. A device as set forth in claim 9 wherein the second electrode is mounted on and underneath a second transparent support.

References Cited in the file of this patent

UNITED STATES PATENTS

| | | |
|---|---|---|
| 2,837,661 | Orthuber et al. | June 3, 1958 |
| 2,875,350 | Orthuber et al. | Feb. 24, 1959 |

OTHER REFERENCES

Kazan et al.: "An Electroluminescent Light-Amplifying Picture Panel," pp. 1888–1897, December 1955, proceedings of the I.R.E.

UNITED STATES PATENT OFFICE
CERTIFICATE OF CORRECTION

Patent No. 3,117,232 January 7, 1964

Gesinus Diemer et al.

It is hereby certified that error appears in the above numbered patent requiring correction and that the said Letters Patent should read as corrected below.

Column 4, line 14, for "omitted" read -- emitted --; column 6, line 21, for "produce dby" read -- produced by --; line 41, after "and" insert -- deposited and --.

Signed and sealed this 30th day of June 1964.

(SEAL)
Attest:

ERNEST W. SWIDER
Attesting Officer

EDWARD J. BRENNER
Commissioner of Patents